(12) United States Patent
Xia et al.

(10) Patent No.: US 11,542,106 B2
(45) Date of Patent: Jan. 3, 2023

(54) METHOD FOR AUTOMATICALLY TRANSFERRING SPOUTED POUCHES AND AUTOMATIC POUCH TRANSFERRING ASSEMBLY

(71) Applicant: The Procter & Gamble Company, Cincinnati, OH (US)

(72) Inventors: Peiliu Xia, Beijing (CN); Fuzhou Fan, Guangzhou (CN)

(73) Assignee: The Procter & Gamble Company, Cincinnati, OH (US)

( * ) Notice: Subject to any disclaimer, the term of this patent is extended or adjusted under 35 U.S.C. 154(b) by 301 days.

(21) Appl. No.: 16/825,002

(22) Filed: Mar. 20, 2020

(65) Prior Publication Data
US 2020/0299071 A1    Sep. 24, 2020

(51) Int. Cl.
*B65G 47/91* (2006.01)
*B25J 9/16* (2006.01)
*B65G 43/08* (2006.01)
*B65D 75/58* (2006.01)

(52) U.S. Cl.
CPC ............ *B65G 47/91* (2013.01); *B25J 9/1697* (2013.01); *B65G 43/08* (2013.01); *B65D 75/5883* (2013.01); *B65G 2201/0235* (2013.01)

(58) Field of Classification Search
CPC ......... B65G 47/91; B65G 43/08; B25J 9/1697
See application file for complete search history.

(56) References Cited

U.S. PATENT DOCUMENTS

| | | | |
|---|---|---|---|
| 5,042,862 A | 8/1991 | Tuebke | |
| 8,562,274 B2 | 10/2013 | Murray | |
| 10,343,857 B2 * | 7/2019 | Morency | B65G 59/02 |
| 10,773,844 B2 * | 9/2020 | Morino | B65H 1/027 |
| 2004/0011001 A1 * | 1/2004 | Hiramoto | B65B 1/02 53/202 |
| 2008/0131244 A1 | 6/2008 | Murray | |
| 2014/0083061 A1 * | 3/2014 | Ibaraki | B65B 3/02 53/558 |
| 2019/0031451 A1 | 1/2019 | Morino | |

FOREIGN PATENT DOCUMENTS

| | | |
|---|---|---|
| CN | 105857742 | 4/2018 |
| JP | S61259929 A | 11/1986 |
| JP | H0878503 A | 3/1996 |
| JP | H10291502 A | 11/1998 |
| JP | 2006290432 A | 10/2006 |
| JP | 2008302962 A | 12/2008 |
| JP | 2011213412 A | 10/2011 |
| JP | 2013091497 A | 5/2013 |
| JP | 2013109691 A | 6/2013 |
| KR | 20030047981 | 6/2003 |
| KR | 20120017796 | 2/2012 |
| WO | WO-2014171814 A1 * | 10/2014 ............ B25J 11/00 |
| WO | WO2018097347 A1 | 5/2018 |

OTHER PUBLICATIONS

AA1342 PCT Search Report for appl. No. PCT/CN2019/079053, dated Jul. 29, 2019, 9 pages.
Supplemental International Search Report and Written Opinion; Application Ser. No. PCT/CN2019/079053; dated Jun. 24, 2021; 13 pages.

* cited by examiner

*Primary Examiner* — Lynn E Schwenning

(57) ABSTRACT

A method for automatically transferring spouted pouches provides a simple, efficient approach for automatically loading spouted pouches from a container to a belt conveyor. And, an automatic pouch transferring assembly is also provided.

9 Claims, 9 Drawing Sheets

METHOD FOR AUTOMATICALLY TRANSFERRING SPOUTED POUCHES AND AUTOMATIC POUCH TRANSFERRING ASSEMBLY

FIELD OF THE INVENTION

The present application is directed to a method for automatically transferring spouted pouches as well as an automatic pouch transferring assembly.

BACKGROUND OF THE INVENTION

Spouted pouches are becoming more popular in many industries, such as food, beverage, laundry, hygiene and the like. On one hand, such spouted pouches are made with flexible films which are cost-effective and easy to ship and store. On the other hand, the spouts on such pouches can be used to effectively dispense liquid contents from the pouches. There is an increasingly wide variety of available spouts that can meet different liquid-dispensing needs. Many liquid products that are once limited to rigid packaging can now be stored in and dispensed from spouted pouches.

However, the current level of automation in packaging cannot effectively handle spouted pouches.

In most manufacturing facilities, empty spouted pouches are manually picked up from their containers and loaded onto an infeed belt conveyor for further processing. Such manual loading is both laborious and inefficient. This is probably due to the difficulty in detecting spouted pouches when they are packed tightly inside a container (for example, a carton). Further, the spouted pouches so packed may not be arranged in order, resulting in further difficulties in locating and gripping these pouches. Additionally, the spouted pouches are very thin and flexible, making it harder to be gripped and transferred out of the container.

Accordingly, it is highly desirable to develop a method for automatically transferring spouted pouches from a container to an infeed belt conveyor as well as a system for implementing such method.

SUMMARY OF THE INVENTION

The present invention provides a simple, efficient approach for automatically transferring spouted pouches out of their original containers and placing them onto an infeed belt conveyor. More particularly, automatically transferring of spouted pouches may be carried out by detecting the spout of a spouted pouch, for example detecting at least one characteristic feature of the spout. The inventors surprisingly discovered that spouted pouches may be accurately located by detecting certain characteristic features of the spout (for example, at least two contour lines), even if they were not packed in perfect order inside a container.

One aspect of the present disclosure provides a method for automatically transferring pouches comprising the steps of: (a) providing a plurality of pouches that are arranged into multiple stacks and placed inside a container, a robotic system comprising an imaging unit, a robotic arm and a control means, and a receiving system, wherein each of the plurality of pouches comprises a spout, and a spout of at least one pouch within the plurality of pouches is visible to the imaging unit; (b) scanning an image of the plurality of pouches by using the imaging unit of the robotic system; (c) detecting at least one feature of the visible spout in the scanned image to determine a location of the visible spout by using the control means of the robotic system; and (d) gripping at least one stack containing the at least one pouch having the visible spout according to the determined location of the visible spout by using the robotic arm and transferring the at least one stack from the container to the receiving system by using the robotic arm.

Another aspect of the present disclosure provides an automatic pouch transferring assembly comprising (1) a robotic system that comprises a robotic arm, an imaging unit and a control means; and (2) a receiving system that comprises a rotating table with a first end and a second, opposite end, a vacuum suction device, and a conveyor that is connectable to the first or second end of the rotating table, wherein the imaging unit of the robotic system may be configured for scanning an image of a plurality of pouches that are arranged into multiple stacks and placed inside a container, and the control means may be configured for detecting at least one feature of a spout of at least one pouch that is visible in the scanned image to determine location of the visible spout and controlling the robotic arm to grip at least one stack of pouches containing the at least one pouch having the visible spout according to the determined location of the spout and to transfer the at least one stack from the container to the receiving system.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, and in which:

DETAILED DESCRIPTION OF THE INVENTION

Figure 1:
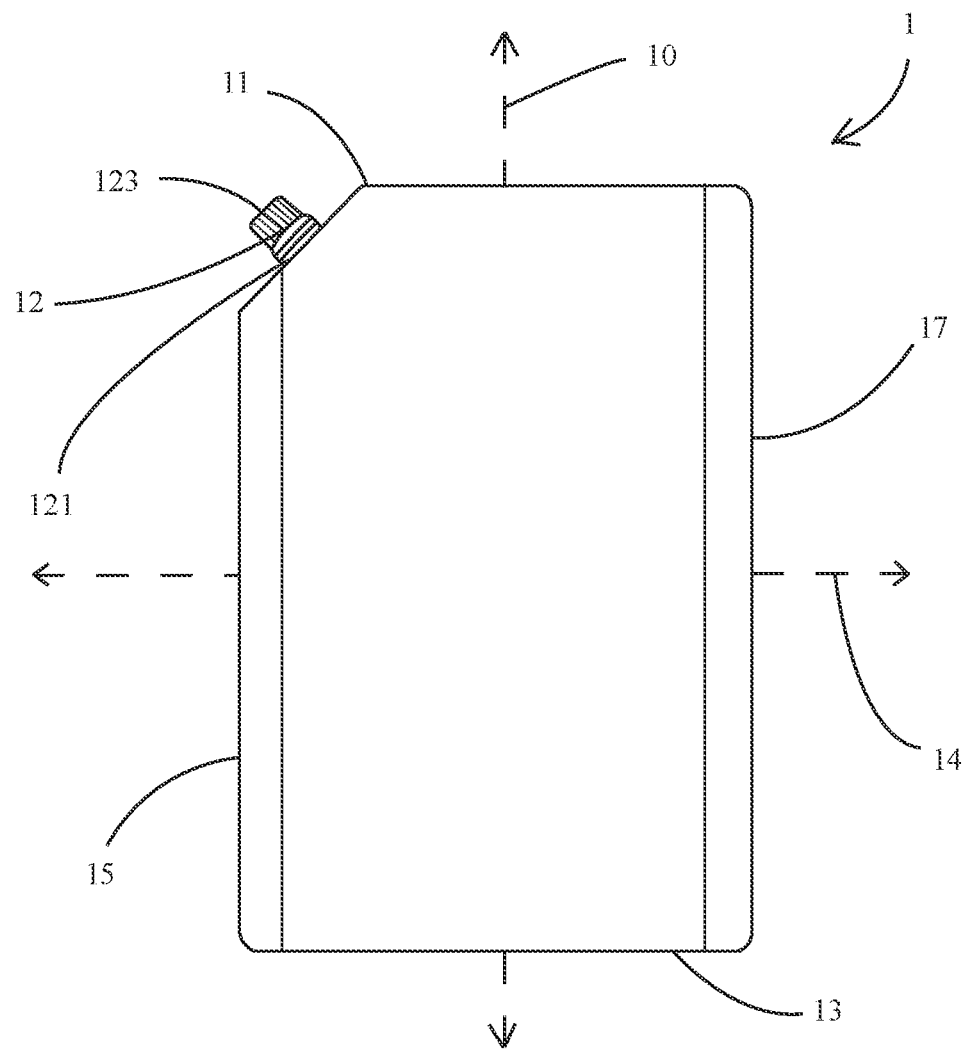
FIG. 1 illustrates an exemplary pouch.

Exemplary embodiments of the present invention will be described in detail hereinafter with reference to the accompanying drawings. While the present invention is shown and described in connection with exemplary embodiments thereof, it will be apparent to those skilled in the art that various modifications can be made without departing from the spirit and scope of the invention. Although terms to designate components in this specification are selected from generally and widely used terms in consideration of the function of the component in the present invention, the meaning of the term may be changed to convey the intention of those skilled in the art to which the present invention pertains or the customary meaning or adapt to the advent of new technology. In addition, in some cases, terms may be randomly selected by applicants while stating the meaning of the term in the corresponding part of the specification of the present invention. Accordingly, it will be understood that terms used in this specification should be construed based on the substantial meaning of the term and the overall context in the specification, instead of being construed only as a name of the component. Certain well-known functions or constitutions will not be described in detail if they would obscure the invention in unnecessary detail.

To meet the need for automatically transferring pouches, the present invention seeks to inter alia establish a transferring operation that can be highly automated and can be adapted to various pouches and/or arrangement of pouches.

Pouches

The term "pouch" as used herein means a flexible package made of polymeric film materials such as polyethylene and/or polypropylene. Particularly, pouches may be stand-up pouches. The term "stand-up pouch" as used herein means a pouch capable of standing securely on a flat surface, for example shelves.

A pouch may have a top edge, a bottom edge that is opposite to the top edge, a first side edge and a second side edge that is opposite to the first side edge.

A pouch may have a longitudinal axis and a transverse axis that is perpendicular to the longitudinal axis. Particularly, the bottom edge may be opposite to the top edge along the longitudinal axis, and/or the second side edge may be opposite to the first side edge along the transverse axis. Preferably, the first side edge may be connected to the top edge at one end of the first side edge and connected to the bottom edge at the other end of the first side edge; and the second side edge may be connected to the top edge at one end of the second side edge and connected to the bottom edge at the other end of the second side edge. Pouches may have an easily openable port that is formed across the whole top of the pouch, and alternatively, pouches may have a spout for pouring (i.e. spouted pouch).

The term "spout" as used herein covers a spout assembly with or without a cap, and particularly, a spout comprises a spout body and a cap that is preferably separable from the spout body. The spout may have any suitable sizes, for example having a diameter of from 1 cm to 10 cm. The spout may be located at any appropriate location, and particularly, the spout may be located on the top edge, for example near a midpoint of the top edge (i.e., top-spout pouches), or near a connection point between the top edge and the first side edge (i.e., corner-spout pouches). The spout may have a centroid. The spout may have one or more features. The term "feature" as used herein means any structural characteristics.

FIG. 1 is a front view of a pouch 1. The pouch 1 has a longitudinal axis 10 and a transverse axis 14 that is perpendicular to the longitudinal axis 10. The pouch 1 comprises a top edge 11, a bottom edge 13 that is opposite to the top edge 11 along the longitudinal axis 10, a first side edge 15 and a second side edge 17 that is opposite to the first side edge 15. At an upper corner, the pouch 1 has a spout 12 that comprises a spout body 121 and a cap 123, in which the cap 123 is separable from the spout body 121.

Preferably, the pouch has a Pouch Length within the range of from about 50 mm to about 1000 mm, preferably about 100 mm to about 500 mm, more preferably about 200 mm to about 400 mm. Pouch Length is measured as length of a pouch from the top edge to the bottom edge along the longitudinal axis. Furthermore, the pouch may have a width within the range of from about 20 mm to about 400 mm, preferably about 40 mm to about 200 mm, more preferably about 100 mm to about 200 mm.

Stacks of Pouches

Pouches may be arranged in stacks. Preferably, pouches in a stack may be substantially the same. Particularly, a plurality of pouches may be arranged so that:

i) any two adjacent pouches in the same stack partially overlap;

ii) the top edges of pouches in the same stack are substantially parallel to each other, and the bottom edges of pouches in the same stack are substantially parallel to each other;

iii) the first side edges of the same stack are substantially parallel to each other, and the second side edges of the same stack are substantially parallel to each other; and iv) centroids of spouts in the same stack are spaced apart at substantially equal distance from each other and form a substantially straight line.

Additionally, a plurality of pouches may be further arranged so that:

v) the top edges of any two adjacent pouches in the same stack do not overlap with each other, and the bottom edges of any two adjacent pouches in the same stack do not overlap with each other; and vi) the first side edges of any two adjacent pouches in the same stack partially overlap with each other, and the second side edges of any two adjacent pouches in the same stack partially overlap with each other.

The stack of pouches according to the present disclosure may have a longitudinal axis extending through the entire stack and a transverse axis that is perpendicular to the longitudinal axis of the stack. Particularly, the longitudinal axis of the stack may be substantially parallel to the longitudinal axes of individual pouches in the stack, and the transverse axis of the stack may be substantially parallel to the transverse axes of individual pouches in the stack.

The stack according to the present disclosure may comprise a top pouch and a bottom pouch, in which the top pouch is the pouch whose top edge is not overlapped with another pouch within the same stack, and the bottom pouch is the pouch whose bottom edge is not overlapped with another pouch within the same stack.

Figure 2:
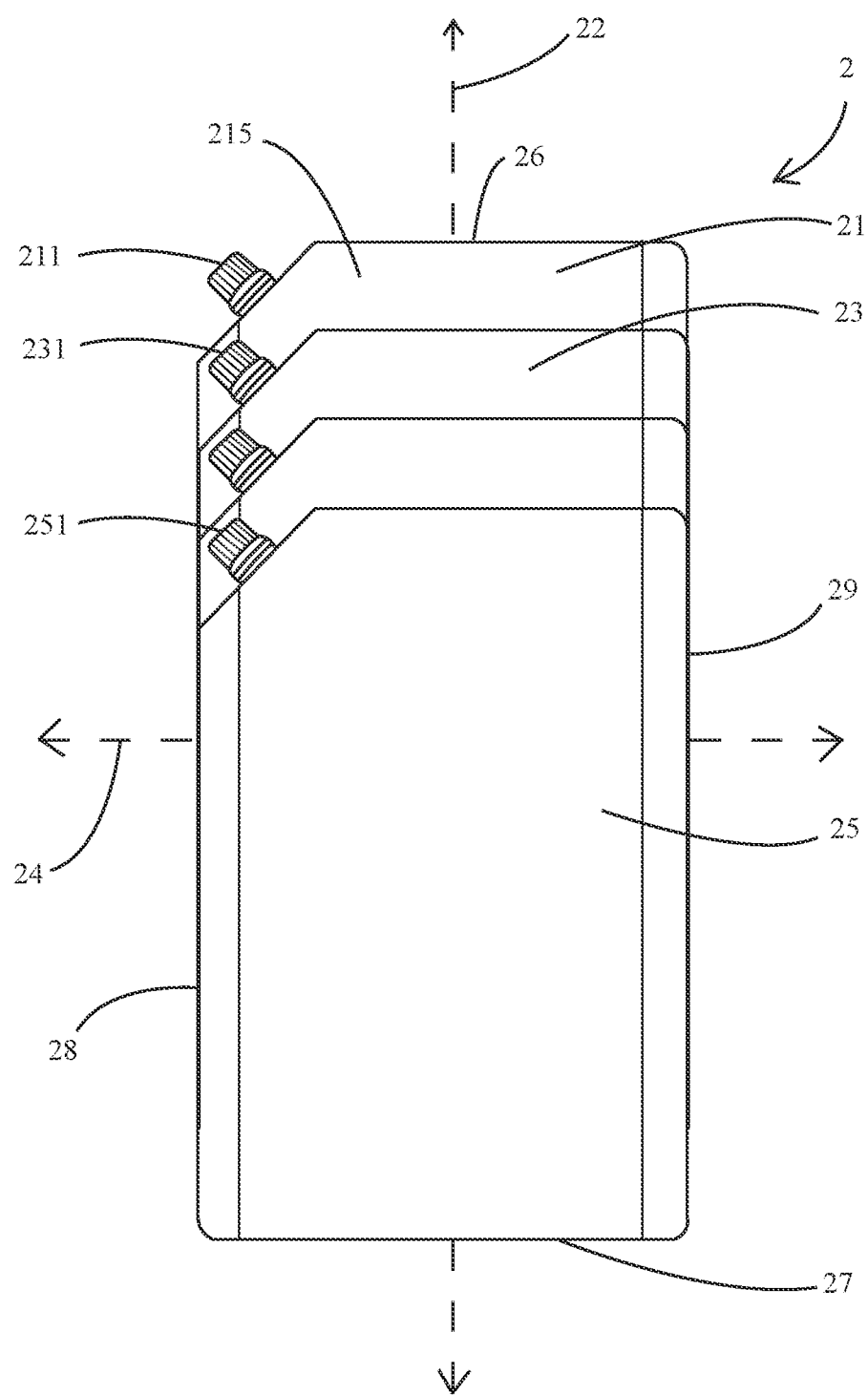
FIG. 2 illustrates an exemplary stack of pouches.

FIG. 2 is a front view of a stack 2 of pouches. The stack 2 comprises a first pouch 21 having a first spout 211, a second pouch 23 having a second spout 231 and a last pouch 25 having a last spout 251, in which the first pouch 21 is the top pouch of the stack 2 and the last pouch 25 is the bottom pouch of the stack 2. The first pouch 21 partially overlaps with the second pouch 23, leaving a non-overlapping area 215. Additionally, the first pouch 21 has a top edge that is a top side 26 of the stack 2 and the last pouch 25 has a bottom edge that is a bottom side 27 of the stack 2. The stack 2 has a first side flank 28 that is formed by the first side edges of pouches in the stack 2 and a second side flank 29 that is formed by the second side edges of pouches in the stack 2. Preferably, the stack 2 has a Stack Length within the range of from about 60 mm to about 2000 mm, preferably about 120 mm to about 1000 mm, more preferably about 240 mm to about 800 mm. Stack Length is measured as length from the top side 26 to the bottom side 27.

Non-overlapping Area Percentage is calculated according to the following equation: Non-overlapping Area Percentage=(the area of a pouch within the two adjacent pouches that is not overlapped with the other pouch/the area of the pouch)×100%. Preferably, Non-overlapping Area Percentage between any two adjacent pouches in the stack of pouches 2 is within the range of from about 3% to about 90%, preferably from about 5% to about 70%, more preferably from about 7% to about 50%, most preferably from about 9% to about 30%, for example about 10%, 15%, 20%, or 25%. Furthermore, when a stack of pouches are transferring by a vacuum suction device, the vacuum suction is mainly applied on the non-overlapping area between two adjacent pouches (i.e. the area of a pouch within the two adjacent pouches that is not overlapped with the other pouch within the two adjacent pouches) except the pouch that is closest to the sponge of the vacuum suction device.

A stack of pouches may comprise from 3 to 20 pouches, preferably 4 to 15 pouches, more preferably 5 to 12 pouches, more preferably 6 to 10 pouches, most preferably 7 to 9 pouches.

Arrangement of Stacks of Pouches

Stacks of pouches may be arranged in various ways in a container. Particularly, multiple stacks may be arranged as a pile in a container and preferably, the number of pouches in each stack within the pile may be the same and each pouch in the pile may be substantially the same. The term of "pile" as used herein means multiple stacks heaped together (i.e., any two adjacent stacks in the pile essentially overlap with each other).

In some embodiments, the multiple stacks according to the present disclosure may be arranged in step (a) so that spouts of pouches in all stacks are visible to said imaging unit. Particularly, for all top pouches of odd-numbered stacks within the multiple stacks, centroids of spouts are spaced apart at substantially equal distance from each other and form a substantially straight line; and for all top pouches of even-numbered stacks within the multiple stacks, centroids of spouts are spaced apart at substantially equal distance from each other and form a substantially straight line. Furthermore, one stack may be gripped and transferred at a time in step (d) of the method according to the present disclosure.

In some other embodiments, the multiple stacks may be arranged in step (a) so that spouts of pouches in only one stack within any two adjacent stacks are visible to said imaging unit, and spouts of pouches in the other stack within said any two adjacent stacks are not visible to said imaging unit. Particularly, for top pouches of all odd-numbered stacks within the multiple stacks, centroids of spouts are spaced apart at substantially equal distance from each other and form a substantially straight line; and for top pouches of all even-numbered stacks within the multiple stacks, centroids of spouts are spaced apart at substantially equal distance from each other and form a substantially straight line. More particular, the number of stacks provided in step (a) may be an even number; or the number of stacks provided in step (a) may be an odd number and the multiple stacks may comprise a first stack and a last stack that are both visible to said imaging unit. Furthermore, if the number of stacks provided in step (a) of the method according to the present disclosure is an even number, two stacks may be gripped and transferred at a time in step (d), and steps (b), (c) and (d) may be repeated until all of the plurality of pouches are gripped and transferred. Alternatively, if the number of stacks provided in step (a) is an odd number in which spouts of the first stack and the last stack are both visible to the imaging unit, two stacks may be gripped and transferred at time in step (d), while steps (b), (c) and (d) may be repeated until the last stack is left, which is then then gripped and transferred alone by the robotic arm.

A pile may have a longitudinal axis of the pile and a transverse axis of the pile that is perpendicular to the longitudinal axis of the pile, in which the longitudinal axis of the pile is parallel to the longitudinal axes of stacks in the pile and the transverse axis of the pile is that is parallel to the transverse axes of stacks in the pile.

The term "visible" as used herein means the imaging unit can scan an image showing at least a part of the spout, preferably the part comprising at least two contours of the spout. In other words, if spouts are not visible to the imaging unit, it means that the imaging unit is not capable of scanning an image showing the spout. For example, the container containing multiple stacks of pouches may have an opening and the imaging unit is arranged above the opening, if pouches having upper-corner spouts are arranged so that spouts are obliquely upwards, then the spouts are visible to the imaging unit, while if pouches having upper-corner spouts are arranged so that spouts are obliquely downwards, the spouts are not visible to the imaging unit.

Figure 3:
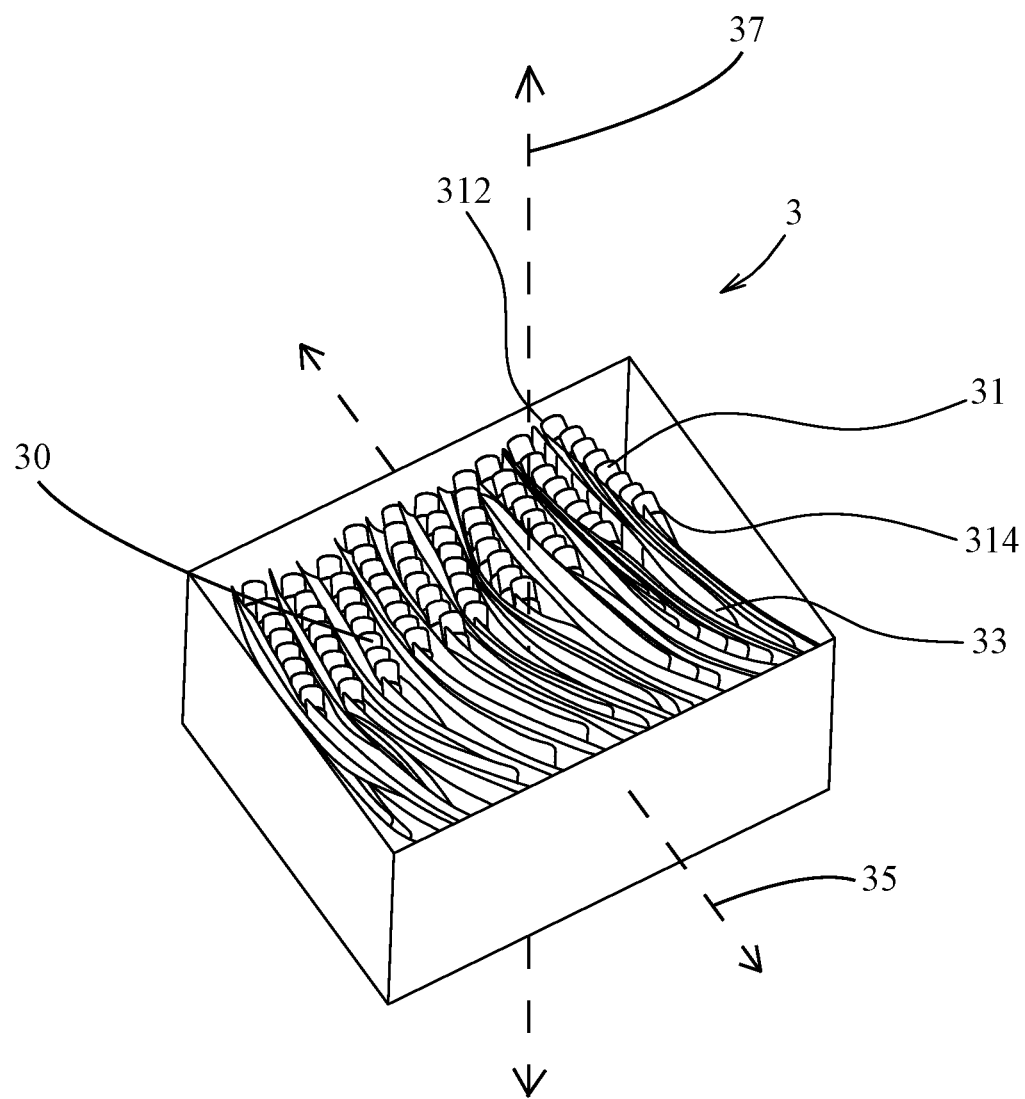
FIG. 3 illustrates an exemplary carton containing multiple stacks of pouches.

FIG. 3 illustrates a carton 3 containing several stacks of spouted pouches (upper-corner spout) as a pile 30 in which spouts of pouches in only one stack within any two adjacent stacks are obliquely upwards, while spouts of pouches in the other stack within the any two adjacent stacks are obliquely downwards (i.e., being invisible in FIG. 3). Particularly, the pile 30 comprises a first stack of pouches 31 and a second stack of pouches 33, in which spouts of the first stack of pouches 31 are obliquely upwards (i.e. being visible to the imaging unit) and spouts of the second stack of pouches 33 are obliquely downwards (i.e. not being visible to the imaging unit). The pile 30 has a longitudinal axis 35 and a transverse axis 37 that is perpendicular to the longitudinal axis 35. Additionally, the first stack of pouches 31 comprises a top pouch having a top spout 312 and a bottom pouch having a bottom spout 314. Preferably, according to the method of the present disclosure, at least one of the top spout 312 and the bottom spout 314 (preferably the bottom spout 314) is detected.

Pouch Transferring Assembly

An aspect of the present disclosure provides an automatic pouch transferring assembly. The assembly comprises a robotic system, a receiving system and optionally, a container table.

The term "robotic system" means an industrial robot system which is automated, programmable and capable of movement on two or more axes. The robotic system may comprise a robotic arm, an imaging unit and a control. The robotic arm may have a distal end and a pair of grippers mounted on the distal end. Particularly, the pair of grippers may grip one or two stacks of pouches. More particularly, the pair of grippers may grip two essentially overlapped stacks of pouches, preferably in which top sides of the two stacks are towards opposite directions in the longitudinal axes of the two stacks. Preferably, the grippers are sufficiently thin to insert between two adjacent stacks, and more preferably, at least one gripper within the pair of grippers may contain a tip that may facilitate the insertion of the grippers. The imaging unit may be configured for scanning an image of a plurality of pouches that are arranged into multiple stacks and placed inside a container, and the imaging unit may comprise a camera. The camera may be provided externally to the robotic arm or as an integral part of the robotic arm, preferably as an integral part of the robotic arm. The imaging unit may be any suitable machine vision units, for example In-Sight® 7000 from Cognex Corporation. The control may be configured for detecting at least one feature of a spout of at least one pouch that is visible in the scanned image to determine location of the visible spout and controlling the robotic arm to grip at least one stack of pouches containing the at least one pouch having the visible spout according to the determined location of the spout and to transfer the at least one stack from the container to the receiving system. Preferably, the control may be an integral chip and/or a remote computer.

The robotic system may be a collaborative robotic system, preferably wherein the collaborative robotic system has a footprint of from 1 cm to 100 cm, preferably from 5 cm to 50 cm, more preferably from 5 cm to 30 cm, most preferably from 8 cm to 20 cm, and/or a reach radius of from 30 cm to 1000 cm, preferably from 50 cm to 800 cm, more preferably from 80 cm to 500 cm, most preferably from 100 cm to 300 cm, and/or a payload of from 3 kg to 100 kg, preferably from 5 kg to 50 kg, more preferably from 7 kg to 30 kg, most preferably from 9 kg to 20 kg. The term "collaborative robotic system" means a robot intended to physically interact with humans in a shared workspace. The robotic system useful in the present disclosure may include for example UR3, UR5, and UR10 available from Universal Robots.

Figure 4:
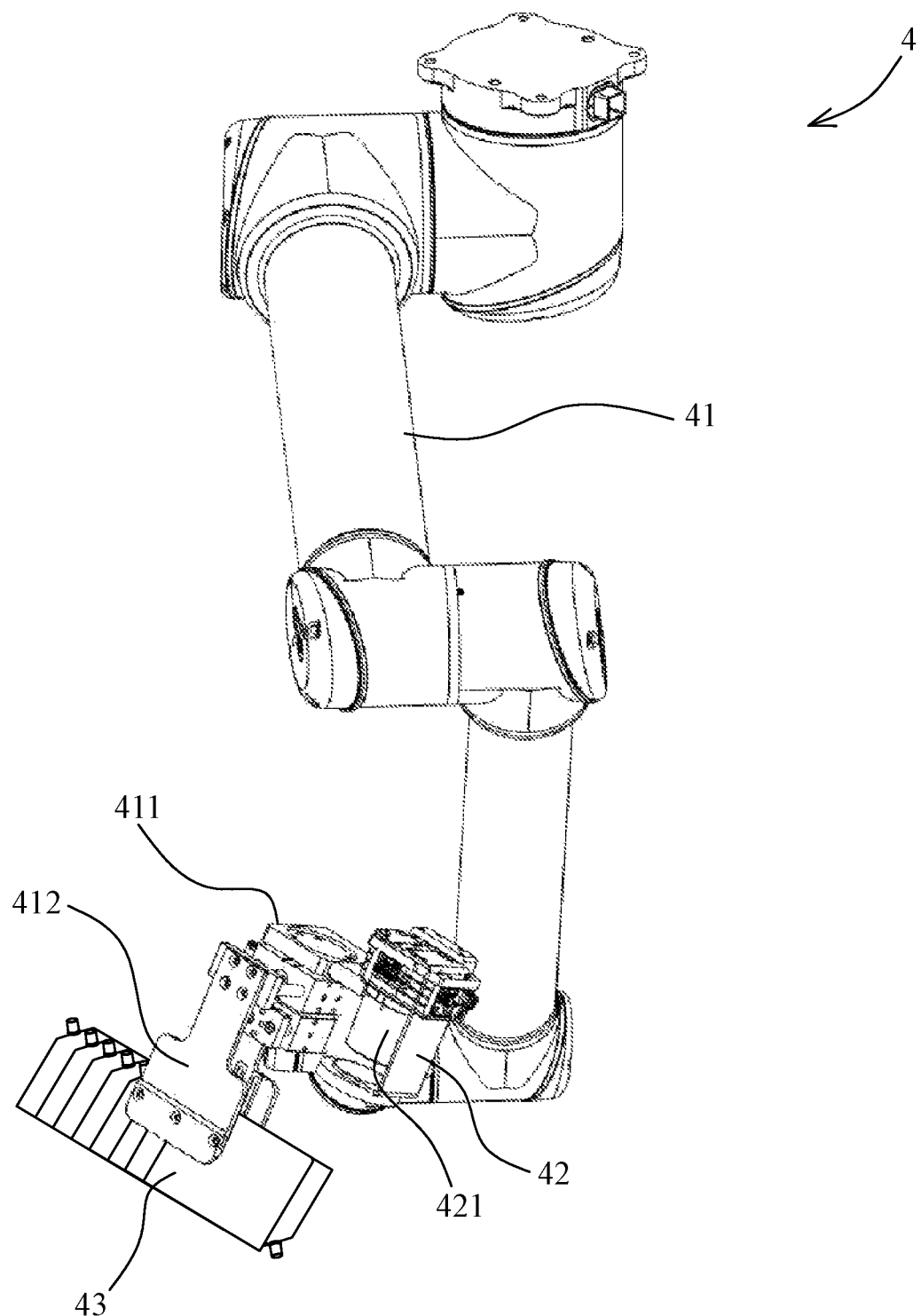
FIG. 4 illustrates an exemplary robotic system.
Figure 8:
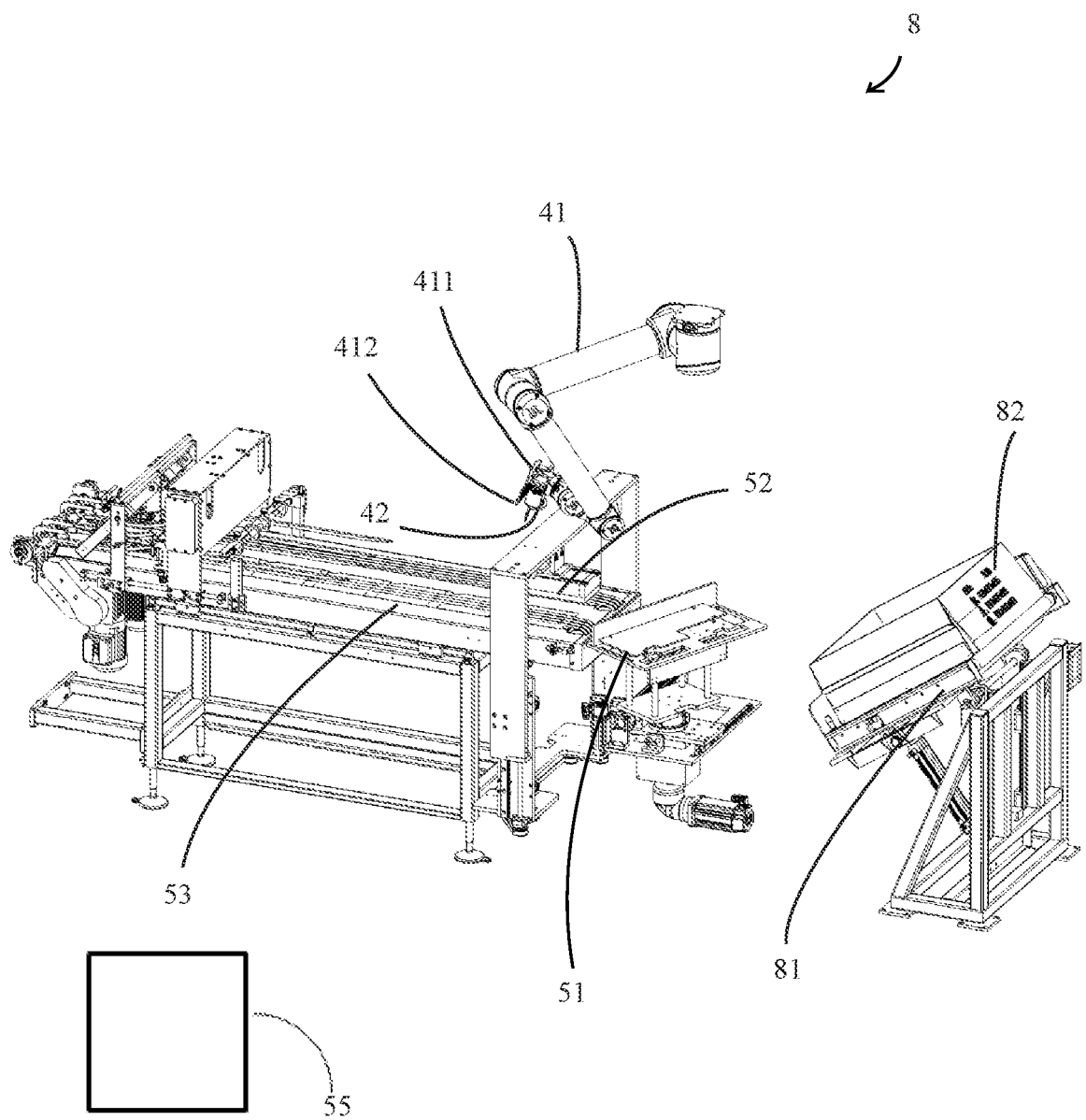
FIG. 8 is a perspective view of an exemplary automatic pouch transferring assembly.

FIG. 4 illustrates a robotic system 4 comprising a robotic arm 41, an imaging unit 42 and a control 55 (indicated in FIG. 8). The robotic arm 41 has a distal end 411 and a pair of grippers 412 mounted on the distal end 411. The imaging unit 42 comprises a camera 421 that is also mounted on the distal end 411 of the robotic arm 41. The pair of grippers 412 is gripping two stacks of pouches 43.

The receiving system may comprise a rotating table with a first end and a second, opposite end, a vacuum suction device, and a conveyor that is connectable to the first or second end of the rotating table. Particularly, the conveyor may be connected to the first end of the rotating table when the rotating table rotates to a position and the conveyor may be connected to the second end of the rotating table when the rotating table rotates to another position. More particularly, the conveyor may comprise a conveying belt, and the first end and the second end of the rotating table are individually connectable to the belt. Alternatively, the conveyor may comprise a first conveying belt that is connectable to the first end of the rotating table and a second conveying belt that is connectable to the second end of the rotating table. The term "connectable" used herein means the distance between two components may become close enough to allow transferring pouches from one component to the other component by a vacuum suction device.

Figure 5:
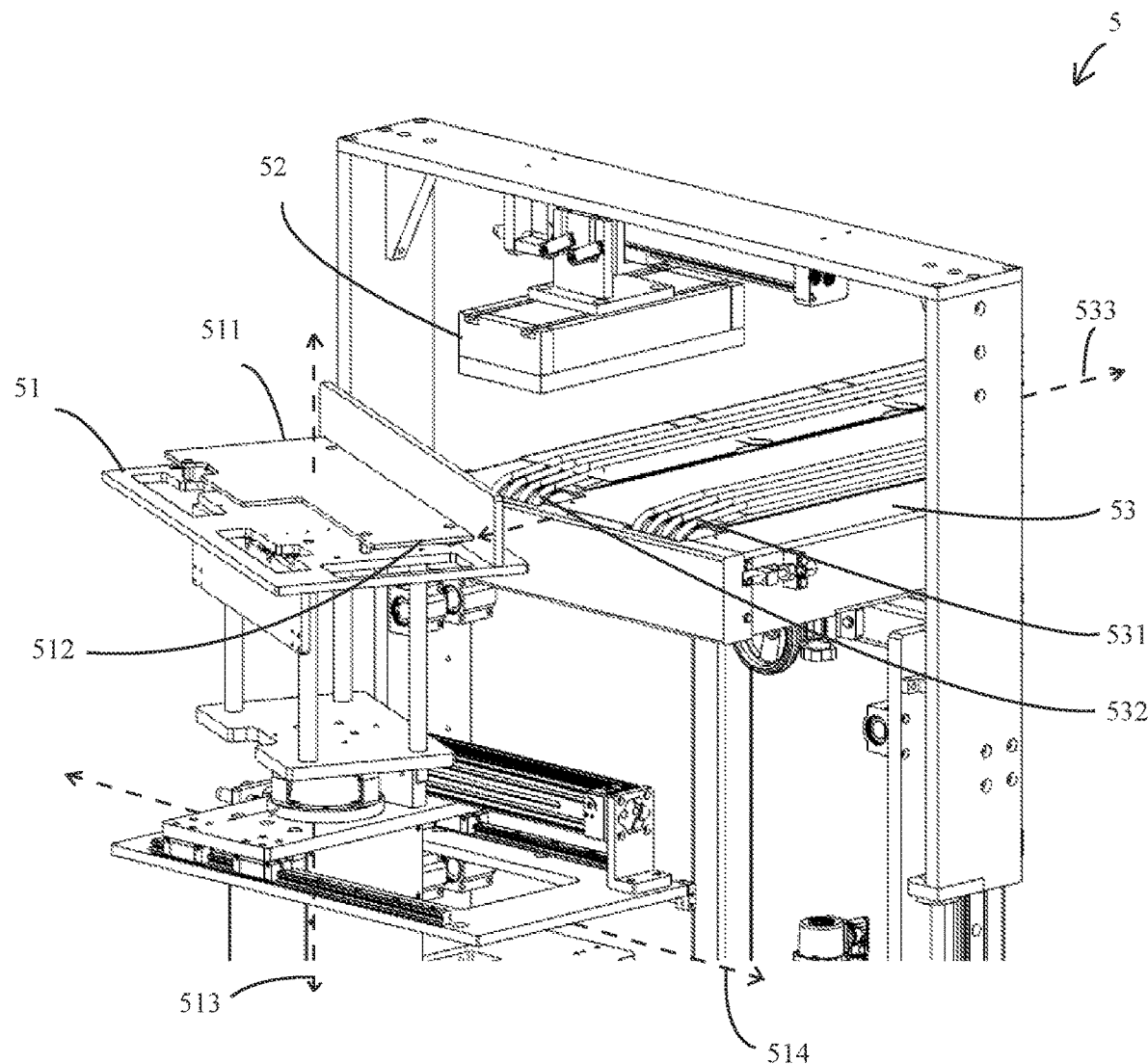
FIG. 5 illustrates an exemplary receiving system.

FIG. 5 illustrates a partial view of an exemplary automatic pouch transferring assembly, indicating a receiving system 5 comprising a rotating table 51, a vacuum suction device 52, and a belt conveyor 53. The belt conveyor 53 has a first belt 531 and a second belt 532. The rotating table 51 has a first end 511 and a second end 512, in which the first end 511 is connectable to the first belt 531 and the second end 512 is connectable to the second belt 532. The belt conveyor 53 has a longitudinal axis 533, and the rotating table 51 has a vertical axis 513 and a horizontal axis 514 in a plane orthogonal to the longitudinal axis 533 of the belt conveyor 53. The rotating table 51 may rotate around the vertical axis 513 and may also move along the horizontal axis 514. Particularly, the rotating table 51 may rotate and move to a first position at which the first end 511 is connected to the first belt 531 and the vacuum suction device 52 has lifted a first stack of pouches for transferring the same to the belt conveyor 53, and the rotating table may rotate and move to a second position at which the second end 512 is connected to the second belt 532 and the vacuum suction device 52 has lifted a second stack of pouches for transferring the same to the belt conveyor 53.

The vacuum suction device may be configured to transfer a stack of pouches from the rotating table to the conveyor, and particularly, the vacuum suction device may lift the stack by applying a suction force, then move to a position above the conveyor and finally put the stack down on the conveyor by withdrawing the suction force. The vacuum suction device may comprise a vacuum pump and a sponge attached to the vacuum pump, preferably wherein the sponge contains a plurality of through holes. Preferably, the vacuum suction device may have a Suction Height within the range of from about 5 mm to about 400 mm, preferably from about 30 mm to about 100 mm, more preferably about 40 mm to about 85 mm. Suction Height is measured as height between the bottom surface of the vacuum suction device and the top surface of the rotating table. Preferably, the ratio of Suction Height to Pouch Length may be within the range of from about 0.1 to about 0.4, preferably about 0.15 to about 0.35, more preferably about 0.2 to about 0.3. When the ratio of Suction Height to Pouch Length is within an appropriate range, the stack would be transferred without dropping any pouch during the transferring (or with an extremely low rate of dropping pouches) or being stuck due to inappropriately contact (for example, too much contact) between pouches and the top surface of the rotating table or the belt conveyor. Without wishing to be bound by any theory, it is believed that, because pouches in a stack might not be perfectly in order, insufficient vacuum force might be applied on some pouches in the stack if the overlapped area is too large between two adjacent pouches, resulting in pouches dropping. In this case, if the ratio of Suction Height to Pouch Length is within an appropriate range, a lower pouch may support an upper pouch if the upper pouch tends to drop due to insufficient vacuum force and push the upper pouch moving forward, and at the same time, the contact between pouches and the top surface of the rotating table is not too much to make pouches stuck.

Particularly, the vacuum pump removes air through the sponge from surfaces of pouches to establish a partial vacuum, and then, the pouches may be lifted with the sponge. Preferably, the vacuum pressure (i.e. the difference between the atmospheric pressure and the absolute pressure) applied by the vacuum pump may be at least about 60 kPa, preferably at least about 70 kPa, more preferably at least about 80 kPa, and most preferably at least about 85 kPa. Useful vacuum pump may be those commercially available, for example, SV1010-1040C from Busch.

Figure 6:
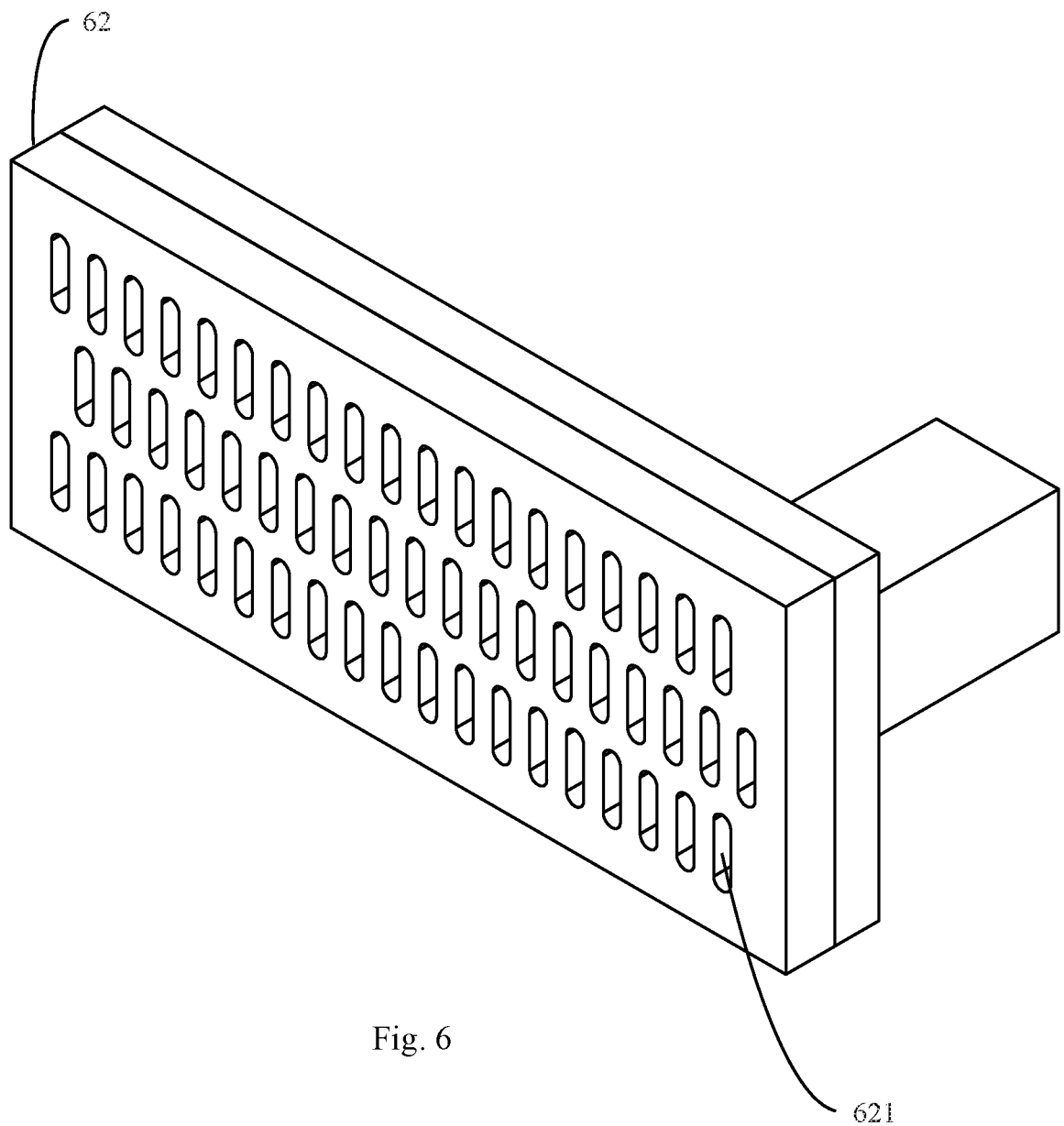
FIG. 6 illustrates a sponge in an exemplary vacuum suction device.

FIG. 6 shows a sponge 62 in a vacuum suction device, comprising a plurality of through holes 621.

Figure 7:
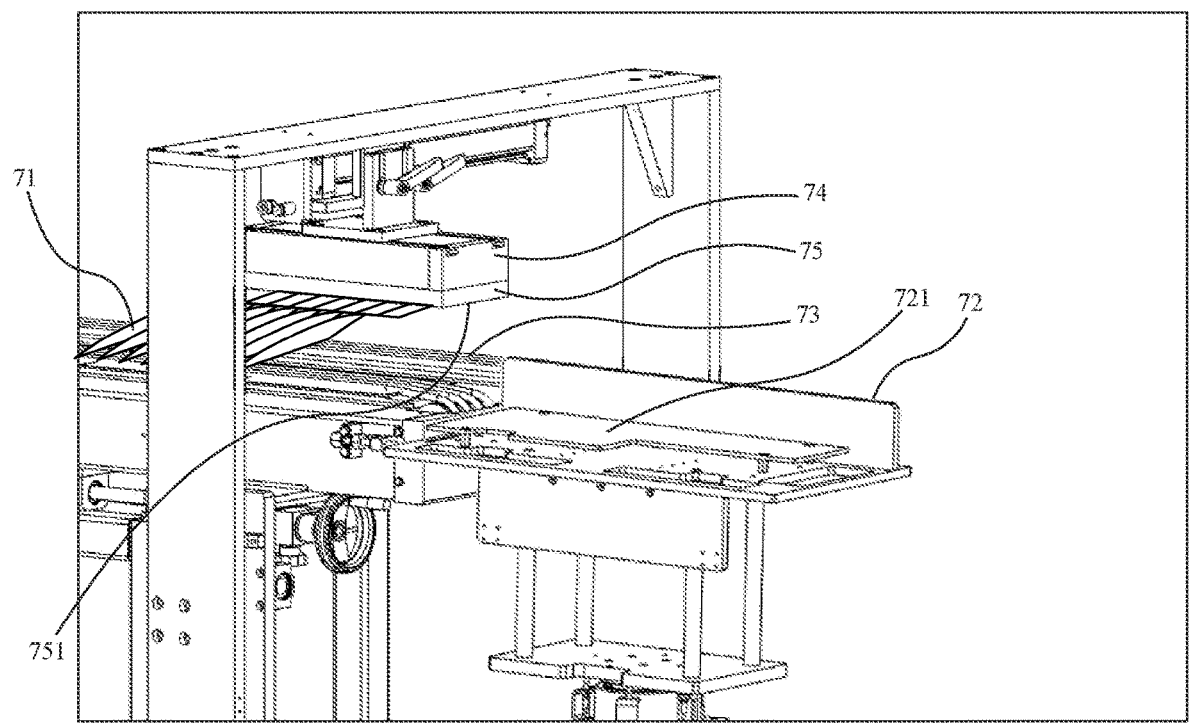
FIG. 7 illustrates a working status of the exemplary vacuum suction device.

Referring to FIG. 7, it shows an exemplary process of transferring a stack of pouches 71 from a rotating table 72 to a belt conveyor 73 by using a vacuum suction device 74. The vacuum suction device 74 has a vacuum pump and a sponge 75 that comprises a bottom surface 751. The rotating table 72 has a top surface 721. Particularly, for each pouch with in the stack of pouches 71, only the non-overlapping area of the pouch is in contact with the sponge 75 except the pouch that is closest to the sponge 75. The Suction Height between the bottom surface 751 of the sponge 75 and the top surface 721 of the rotating table 72 may be adjusted based on the Pouch Length of pouches in the stack of pouches 71 to make sure transferring the stack of pouches 71 from the rotating table 72 to the belt conveyor 73 without dropping or inappropriately touching the top surface 721 of the rotating table 72.

The container table in the automatic pouch transferring assembly may be configured for holding a container (for example, a carton) in which a plurality of pouches arranged in multiple stacks are placed. The container table may be arranged in any place, as long as it is accessible for the robotic system.

FIG. 8 is an overall view of an automatic pouch transferring assembly 8 comprising a robotic arm 41, an imaging unit 42, a belt conveyor 53, a rotating table 51, a vacuum suction device 52, and a container table 81. The robotic arm 41 has a distal end 411 and a pair of grippers 412 mounted on the distal end 411. The imaging unit 42 is also mounted on the distal end 411 of the robotic arm 41. On the container table 81, a carton 82 containing a plurality of pouches is placed.

Transferring Pouches from Container to Receiving System

Another aspect of the disclosure provides a process of transferring pouches from a container (for example, a carton) to a receiving system. The process comprises the steps of: (a) providing a plurality of pouches that are arranged into multiple stacks and placed inside a container, a robotic system comprising an imaging unit, a robotic arm and a control, and a receiving system, wherein each of the plurality of pouches comprises a spout, and a spout of at least one pouch within the plurality of pouches is visible to the imaging unit; (b) scanning an image of the plurality of pouches by using the imaging unit of the robotic system; (c) detecting at least one feature of the visible spout in the scanned image to determine a location of the visible spout by using the control of the robotic system; and (d) gripping at least one stack containing the at least one pouch having the visible spout according to the determined location of the visible spout by using the robotic arm and transferring the at least one stack from the container to the receiving system by using the robotic arm.

In step (b) of the method of transferring pouches from a container to a receiving system, the visible spout may be the spout of a top pouch or a bottom pouch, preferably the spout of the bottom pouch. More particularly, the scanned image in step (b) shows one or more additional spouts that are also visible to the imaging unit, and in step (c), at least one feature of each of the one or more additional spouts are also detected to determine locations of the one or more additional spouts. In step (d) of the method of transferring pouches from a container to a receiving system, one or two stacks of pouches may be preferably gripped and transferred in stacks by the robotic arm.

A feature of a spout may comprise any structural characteristics, for example a contour line of a spout in the scanned image. Preferably, the at least one feature may comprise at least two contour lines. The term "contour" as used herein means a boundary between segments in an image, for example a border or an outline of an object, and may be understood simply as a line joining all the continuous points having same or extremely similar color or intensity in an image. Without wishing to be bound by any theory, it is believed that, when at least two contour lines are detected in the method according to the present disclosure, the rate of incorrect detection would be even lower if present, because it would better reflect slightly varying arrangement of pouches in the container. Particularly, the contour line may be selected from the group consisting of a straight line, a curved line, a bent line, and any combinations thereof. The term "bent line" means a line that suddenly changes direction at one or more points or in one or more places, for example having a vertex or a corner. The contour line detected in the method according to the present disclosure may have at least 10 pixels, preferably at least 50 pixels, and more preferably at least 100 pixels.

Preferably, the at least two contour lines may include one curved line having a curvature of more than 0 and another curved line having a curvature of less than 0. More preferably the at least two contour lines may include one curved line that is a top border of the visible spout in the image and another curved line that is a bottom border of the visible spout in the image. Most preferably, the top border of the visible spout may be on the cap of the spout and the bottom border of the visible spout may be on the spout body of the spout. It brings about surprisingly accurate detection when the top border of the cap and the bottom border of the spout body are used as the contour lines as detected.

The method of transferring pouches from a container to a receiving system may be carried out by using a machine vision software (for example, In-Sight® Explorer from Cognex). Furthermore, prior to applying the method according to the present disclosure, the software program used for detecting a pattern (i.e., at least two contour lines) indicating the location of a visible spout may be trained as follows:

(i) scanning multiple images of a plurality of pouches placed in a container by using the robotic system in which each scanned image indicates at least one spout and the plurality of pouches is arranged in the same way with pouches to be processed in the method according to the present disclosure;

(ii) manually selecting a top border and a bottom border of the at least one spout in a scanned image in (i) as the pattern by the operator (i.e., the user of the software) using EditCompositeRegion tool in In-Sight® Explorer and (iii) training the pattern with the scanned multiple images using TrainPatMaxPattern tool in In-Sight® Explorer.

Furthermore, prior to applying the method according to the present disclosure, some of predetermined parameters are inputted, in which the predetermined parameters include but are not limited to Pouch Length, the size of a spout (for example, the length and the width of the trained pattern in the scanned image), Stack Length, the thickness of a stack, the size of the container (for example, the length and the width of the container), the thickness of container wall, the width of a pouch, the logic for selecting a target spout among detected spouts (for example, selecting the spout of the bottom pouch in the first stack in the scanned image) and the arrangement of stacks.

Figure 9:
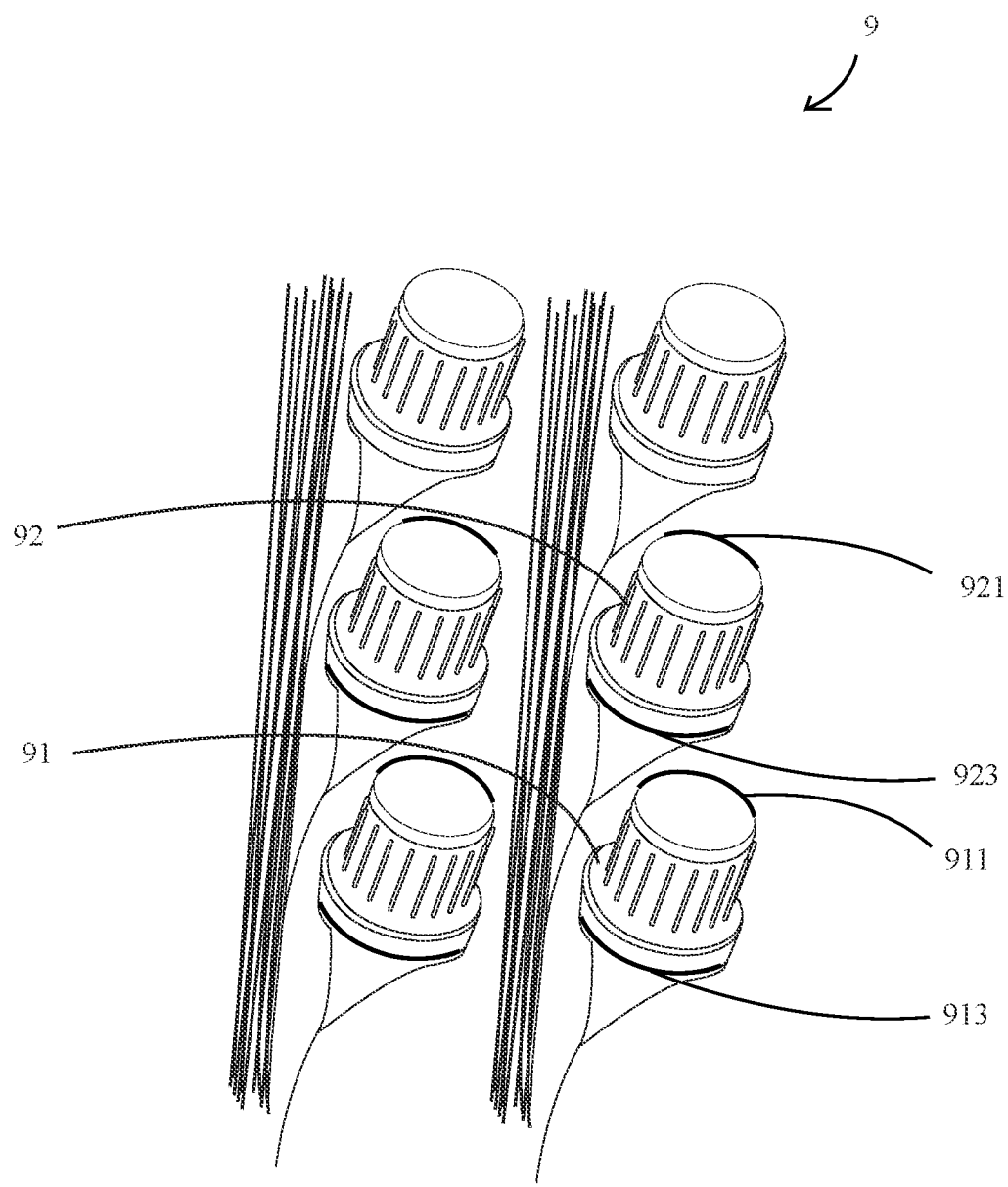
FIG. 9 illustrates an exemplary scanned image with visible spouts and their detected contour lines according to an embodiment of the present invention.

FIG. 9 illustrates a scanned image 9 obtained by the robotic system according to an embodiment of the present disclosure, in which a visible spout 91 and a plurality of other spouts that are also visible to the imaging unit, including an additional spout 92, are detected. Particularly, a first top border 911 and a first bottom border 913 of the visible spout 91 as well as a second top border 921 and a second bottom border 923 of the additional spout 92 are detected using a machine vision technology, for example In-Sight® Explorer, VisionView®, PatMax® including EditCompositeRegion, TrainPatMaxPattern and FindPatMaxPattern tools, available from Cognex Corporation and the like. Then, the locations of the visible spout 91 and the additional spout 92 are determined by using the software as above based on the detected contours. Particularly, the location of the visible spout 91 is further selected according to the pre-defined settings (for example, the spout at the bottom right corner in the scanned image would be assigned as the visible spout 91).

Preferably, the camera may scan an image every time before gripping stack(s) of pouches. More preferably, steps (b) to (d) of the method according to the present disclosure may be repeated. Without wishing to be bound by any theory, it is believed that, after one or more stacks of pouches are gripped out, the positions of remaining pouches may slightly change due to reduced degree of compression for pouches. Thus, it would be more accurate to grip stack(s) of pouches according to the image scanned immediately before the gripping. Furthermore, working positions of the camera (i.e., the position of the camera when scanning an image) may depend on the positions of stack(s) to be gripped. More particularly, the working position of the camera may be pre-determined for gripping the first stack in the pile placed in the container, and a next working position of the camera for the next stack may be determined according to the determined location of the visible spout in the first stack and the thickness of the stack.

After determining the location of the visible pouch (for example, the bottom pouch in a stack of pouches), a target location for the pair of grippers may be calculated according to the determined location of the visible pouch and pre-determined setting such as the Pouch Length, the Stack Length, the size of the spout, the number of pouches in a stack, the thickness of the pouch, Non-overlapping Area Percentage, the thickness of the interspace between stacks, and/or the number of stacks to be gripped (one or two stacks). Then, according to the target location, the pair of grippers may be inserted the interspaces between stacks for gripping one or two stacks.

Particularly, the receiving system may comprise a rotating table with a first end and a second, opposite end, a vacuum suction device comprising a vacuum pump and a sponge attached thereto, and a conveyor that is connectable to the first or second end of the rotating table. More particularly, when two stacks of pouches are gripped by the robotic arm and transferred to the rotating table in step (d), the method according to the present disclosure may further comprise the following steps: (e) connecting the first end of the rotating table to the conveyor and transferring one of the two stacks of pouches from the rotating table to the conveyor by using the vacuum suction device; (f) rotating the rotating table to connect the second, opposite end of the rotating table to the conveyor; and (g) transferring the other of the two stacks of pouches from the rotating table to the conveyor by using the vacuum suction device. Preferably, steps (b) to (g) of the method according to the present disclosure may be repeated.

In the coordinate system as used herein, X and Y axes are in a plane that is orthogonal to the transverse axis of the pile placed in the container, in which X axis is parallel to the longitudinal axis of the pile (i.e., the direction along one of the length and the width of the container) and Y axis is parallel to a direction that is perpendicular to the longitudinal axis (i.e., the direction along the other of the length and the width of the container). Furthermore, for example, the origin may be the left top corner of the container.

In an embodiment of the present disclosure, a typical process of transferring pouches from a container (for example, a carton) to a receiving system may be carried out as follows:

i) providing multiple stacks of spouted pouches as a pile placed inside a container, a robotic system comprising an imaging unit, a robotic arm and a control, and a receiving system comprising a rotating table, a vacuum suction device and a conveyor, in which the rotating table comprises a first end and a second, opposite end, wherein the multiple stacks are arranged so that:

1) spouts of pouches in only one stack within any two adjacent stacks are visible to the imaging unit, and spouts of pouches in the other stack within the any two adjacent stacks are not visible to the imaging unit (for example, spouts of all odd-numbered stacks are obliquely upward and spouts of all even-numbered stacks are obliquely downward when spouts are upper-corner spouts), 2) for top pouches of all odd-numbered stacks within the multiple stacks, centroids of spouts are spaced apart at substantially equal distance from each other and form a substantially straight line and for top pouches of all even-numbered stacks within the multiple stacks, centroids of spouts are spaced apart at substantially equal distance from each other and form a substantially straight line (for example, top pouches of all odd-numbered stacks are towards left and top pouches of all even-numbered stacks are towards right), 3) the number of stacks in the pile is an odd number, wherein spouts of the first stack and the last stack are both visible to the imaging unit;

ii) scanning an image of the first stack in the pile at a predetermined position (Scanning Position a) by using the robotic arm, in which Scanning Position a is, for example indicated by coordinates $(X_a, Y_a)$, at around the midpoint of the first stack, and particularly, $X_a$ is around half of Stack Length and $Y_a$ is the sum of the thickness of the stack and the wall thickness of the container;

iii) finding patterns in the image scanned in the step ii) using FindPatMaxPattern tool in In-Sight® Explorer software based on the trained pattern and determining a target pattern (i.e., a target spout) among the found patterns based on a predetermined logic (for example, selecting the spout of the bottom pouch in the first stack in the scanned image) to provide a target position of the target pattern (Target Position I), for example indicated by coordinates $(X_1, Y_1)$, and particularly, Target Position I is the centroid of the target pattern;

iv) calculating Gripping Position A, for example indicated by coordinates $(X_A, Y_A)$ based on Target Position I and some predetermined parameters, for example $X_A=X_1$+the half length of the trained pattern, and $Y_A=Y_1+2$ X (the thickness of the stack)–the half width of the trained pattern, and gripping the first stack and the adjacent stack thereof (i.e., the second stack) by using the robotic arm, wherein the gripping is achieved by inserting the tip of grippers at Gripping Position A to a depth that is around half width of the pouch and then fastening the first stack and the adjacent stack thereof;

v) transferring the first stack and the adjacent stack thereof from the container to the rotating table by using the robotic arm;

vi) connecting the first end of the rotating table to the conveyor and transferring one of the first stack and the adjacent stack thereof from the rotating table to the conveyor by using the vacuum suction device;

vii) rotating the rotating table to connect the second, opposite end of the rotating table to the conveyor;

viii) transferring the other of the first stack and the adjacent stack thereof from the rotating table to the conveyor by using the vacuum suction device;

ix) scanning an image of the remaining stacks in the pile at Scanning Position b by using the robotic arm, in which Scanning Position b, for example indicated by coordinates $(X_b, Y_b)$, is calculated based on Gripping Position A and predetermined parameters, for example, $X_b=X_A$ and $Y_b=Y_A+2$ X the thickness of the stack;

x) finding patterns in the image scanned in the step ix) using FindPatMaxPattern tool based on the trained pattern and determining a target pattern (i.e., a target spout) among the found patterns based on a predetermined logic (for example, selecting the spout of the bottom pouch in the first stack among the remaining stacks in the scanned image) to provide a target position of the target pattern (Target Position II), for example indicated by coordinates $(X_2, Y_2)$, and particularly, Target Position II is the centroid of the target pattern;

xi) calculating Gripping Position B, for example indicated by coordinates $(X_B, Y_B)$ based on Scanning Position b and the deviation between Target Position II and Target Position I, for example $X_B=X_b+(X_2-X_1)$, and $Y_B=Y_b+(Y_2-Y_1)$, and gripping a first stack among the remaining stacks and the adjacent stack thereof, wherein the gripping comprises inserting the tip of grippers at Gripping Position B to a depth that is around half width of the pouch and then fastening the first stack among the remaining stacks and the adjacent stack thereof;

xii) transferring the first stack among the remaining stacks and the adjacent stack thereof as described in v) to viii);

xiii) repeating ix) to xii) until one stack left in the container (i.e., the last stack), in which the calculated gripping position of the last cycle in xiii) is Gripping Position B' indicated by coordinates $(X_{B'}, Y_{B'})$;

xiv) scanning an image of the last stack in the pile at Scanning Position c by using the robotic arm, in which Scanning Position c is, for example indicated by coordinates $(X_c, Y_c)$, calculated based on Gripping Position B' and predetermined parameters, for example, $X_c=X_{B'}$, and $Y_c=Y_{B'}$+the thickness of the stack;

xv) finding patterns in the image scanned in the step xiv) using FindPatMaxPattern tool based on the trained pattern and determining a target pattern (i.e., a target spout) among the found patterns based on a predetermined logic (for example, selecting the spout of the bottom pouch in the last stack in the scanned image) to provide a target position of the target pattern (Target Position III), for example indicated by coordinates $(X_3, Y_3)$, and particularly, Target Position III is the centroid of the target pattern;

xvi) calculating Gripping Position C, for example indicated by coordinates $(X_C, Y_C)$ based on Target Position III and some predetermined parameters, for example $X_C=X_3+$ the half length of the trained pattern, and $Y_C$=the width of container−the thickness of the container wall, and gripping the last stack by inserting the tip of grippers at Gripping Position C to a depth that is around half width of the pouch;

xvii) transferring the last stack from the container to the rotating table by using the robotic arm; and xviii) connecting the first end of the rotating table to the conveyor and transferring the last stack from the rotating table to the conveyor by using the vacuum suction device.

It is an advantage of the method according to the present disclosure that the method may eliminate or at least minimize manual labor during the transferring of spouted pouches from containers to infeed belt conveyors.

It is an advantage of the method according to the present disclosure that the method may be high efficient (for example, transferring a stack of pouches instead of transferring pouches one by one) and/or have a low failure rate (for example, extremely low rate of erroneously gripping a stack of pouches if any or extremely low rate of dropping pouches during transferring if any).

It is an advantage of the method according to the present disclosure that the method may be compatible with different spouted pouches.

It is an advantage of the method according to the present disclosure that the method may be implemented using a very compact device. In other words, the robotic system according to the present disclosure may be very compact in terms of space.

These and other features, aspects and advantages of specific embodiments will become evident to those skilled in the art from a reading of the present disclosure.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for automatically transferring pouches comprising:
   (a) providing a plurality of pouches that are arranged into multiple stacks and placed inside a container, a robotic system comprising an imaging unit, a robotic arm and a control, and a receiving system,
   wherein each of said plurality of pouches comprises a spout,
   wherein said plurality of pouches comprises at least one pouch with a spout that is visible to said imaging unit;
   (b) scanning an image of said plurality of pouches by using said imaging unit of said robotic system;
   (c) detecting at least one feature of said visible spout in said scanned image to determine a location of said visible spout by using said control of said robotic system; and
   (d) gripping at least one stack including said at least one pouch according to said determined location of said visible spout and transferring said at least one stack from said container to said receiving system by using said robotic arm wherein each pouch within said plurality of pouches has a top edge, a bottom edge that is opposite to the top edge, a first side edge and a second side edge that is opposite to the first side edge, and wherein said plurality of pouches are arranged in (a) so that:
   i) any two adjacent pouches in the same stack partially overlap with each other;
   ii) the top edges of pouches in the same stack are substantially parallel to each other, and the bottom edges of pouches in the same stack are substantially parallel to each other;
   iii) the first side edges of the same stack are substantially parallel to each other, and the second side edges of the same stack are substantially parallel to each other; and
   iv) centroids of spouts in the same stack are spaced apart at substantially equal distance from each other and form a substantially straight line; and wherein said multiple stacks are arranged in (a) so that spouts of pouches in only one stack within any two adjacent stacks are visible to said imaging unit, and spouts of pouches in the other stack within said any two adjacent stacks are not visible to said imaging unit; and wherein the number of stacks provided in (a) is an even number; or wherein the number of stacks provided in (a) is an odd number and the multiple stacks comprises a first stack and a last stack that are both visible to said imaging unit.

2. The method according to claim 1, wherein said at least one feature comprises at least two contour lines.

3. The method according to claim 1, wherein said multiple stacks are arranged in (a) so that spouts of pouches in each stack are visible to said imaging unit.

4. The method according to claim 1, wherein said receiving system comprises a rotating table with a first end and a second, opposite end, a vacuum suction device comprising a vacuum pump and a sponge attached thereto, and a conveyor that is connectable to the first or second end of said rotating table, wherein two stacks are gripped by said robotic arm and transferred to said rotating table in (d), followed by:
   (e) connecting the first end of said rotating table to said conveyor and transferring one of said two stacks from said rotating table to said conveyor by using said vacuum suction device;
   (f) rotating said rotating table to connect the second, opposite end of said rotating table to said conveyor; and
   (g) transferring the other of said two stacks from said rotating table to said conveyor by using said vacuum suction device.

5. The method according to claim 4, wherein:
each of said plurality of pouches has a Pouch Length within the range of from 50 mm to 1000 mm; and/or
each stack has a Stack Length within the range of from 60 mm to 2000 mm; and/or
each stack comprises from 3 to 20 pouches;
and/or Non-overlapping Area Percentage between any two adjacent pouches in each stack is within the range of from 3% to 50%; and/or said vacuum suction device has a Suction Height within the range of from 5 mm to 400 mm; and/or the ratio of Suction Height to Pouch Length is within the range of from 0.1 to 0.4.

6. The method according to claim 1, wherein said robotic system is a collaborative robotic system, wherein said collaborative robotic system has a footprint of from 1 cm to 100 cm, and/or a reach radius of from 30 cm to 1000 cm, and/or a payload of from 3 kg to 100 kg.

7. The automatic pouch transferring assembly of claim 1, wherein said at least two contour lines are selected from the group consisting of a straight line, a curved line, a bent line and any combinations thereof.

8. The automatic pouch transferring assembly of claim 1, wherein said at least two contour lines include one curved line having a curvature of more than 0 and another curved line having a curvature of less than 0.

9. The automatic pouch transferring assembly of claim 1, wherein said at least two contour lines include one curved line that is a part of a top border of the visible spout in the image and another curved line that is a part of a bottom border of the visible spout in the image.

* * * * *